United States Patent
Wang et al.

(10) Patent No.: US 10,611,399 B2
(45) Date of Patent: Apr. 7, 2020

(54) METHOD OF EVALUATING THE HEALTH STATUS OF BELT DRIVE IN ELECTRIC POWER STEERING SYSTEM

(71) Applicant: HIWIN TECHNOLOGIES CORP., Taichung (TW)

(72) Inventors: Eric Wang, Taichung (TW); Yi-Wei Liao, Taichung (TW); Chun-Yu Huang, Taichung (TW); Ming-Si Yan, Taichung (TW); Hsin-Fu Wang, Taichung (TW)

(73) Assignee: HIWIN TECHNOLOGIES CORP., Taichung (TW)

(*) Notice: Subject to any disclaimer, the term of this patent is extended or adjusted under 35 U.S.C. 154(b) by 334 days.

(21) Appl. No.: 15/864,368

(22) Filed: Jan. 8, 2018

(65) Prior Publication Data

US 2019/0210639 A1    Jul. 11, 2019

(51) Int. Cl.
*B62D 5/04*    (2006.01)
*F16H 57/01*    (2012.01)
*G01M 13/02*    (2019.01)
*B62D 15/02*    (2006.01)

(52) U.S. Cl.
CPC ......... *B62D 5/0481* (2013.01); *B62D 5/0424* (2013.01); *B62D 15/0215* (2013.01); *F16H 57/01* (2013.01); *G01M 13/02* (2013.01)

(58) Field of Classification Search
CPC ............... B62D 5/0481; B62D 5/0424; B62D 15/0215; F16H 57/01
See application file for complete search history.

(56) References Cited

U.S. PATENT DOCUMENTS 8,634,986 B2    1/2014  Ghoneim

FOREIGN PATENT DOCUMENTS

| CN | 105480296 A | 4/2016 |
|---|---|---|
| CN | 107154084 A | 9/2017 |
| DE | 102008021849 A1 | 11/2009 |
| DE | 112016005056 T5 | 7/2018 |
| JP | 2008-105604 A | 5/2008 |
| JP | 2010-101582 A | 5/2010 |
| KR | 10-2009-0097625 A | 9/2009 |
| KR | 10-1167086 B1 | 7/2012 |
| KR | 10-2013-0053896 A | 5/2013 |
| TW | I443523 B | 7/2014 |
| WO | WO2017/061257 A1 | 4/2017 |

*Primary Examiner* — Michael D Lang
(74) *Attorney, Agent, or Firm* — Muncy, Geissler, Olds & Lowe, PC

(57) ABSTRACT

A method of evaluating the health status of belt drive in electric power steering system by detecting the occurrence of sliding teeth in the electric power steering system and the frequency of occurrence and the output of the motor. In this way, the user really knows the belt drive health of the electric power steering system.

6 Claims, 7 Drawing Sheets

METHOD OF EVALUATING THE HEALTH STATUS OF BELT DRIVE IN ELECTRIC POWER STEERING SYSTEM

BACKGROUND OF THE INVENTION

1. Field of the Invention

The present invention relates to linear driving technology and more particularly, to a method of evaluating the health status of a belt drive in an electric power steering system.

2. Description of the Related Art

With the development of automotive technology and the rise of environmental awareness, the automobile has been gradually replacing the traditional hydraulic power steering system with the electric power steering system. The reason is that:

1. In engine running, the hydraulic pump of a traditional hydraulic power steering system keeps working and consuming some of the engine power, increasing the entire engine oil consumption. In contrast, the battery of an electric steering system is the source of energy, independent of engine operation without increasing the engine power consumption. In addition, the work efficiency of an electric steering system is better than a hydraulic power steering system, saving fuel consumption.

2. An electric power steering system can be integrated in the same device to increase the convenience of assembly and maintenance. In a hydraulic power steering system, different components are arranged in different places and then linked through a pipeline configuration to produce steering assist function.

3. An electric power steering system eliminates the hydraulic oil replacement problem of a hydraulic power steering system, and is more environmentally friendly.

4. An electric power steering system allows implementation of software-based control for controlling different driving conditions to improve the stability and comfort of car operation. A hydraulic power steering system is to maintain a fixed auxiliary force, it does not allow change of the auxiliary power according to the driving conditions.

Conventional electric power steering systems include column-type electric power steering systems (Column-Type EPS), pinion-type electric power steering systems (Pinion-Type EPS) and rack-type electric power steering systems (Rack-Type EPS).

For rack-type electric power steering system (Rack-Type EPS), the operation mode is that after the user turns the steering wheel, the steering column drives the pinion to engage the toothed portion of the steering rack, thereby driving the steering rack to move. At the same time, the torque sensor installed in the steering column will transmit information to the electronic control unit, and then the electronic control unit controls the motor to drive the drive wheel and the belt, causing the belt to rotate the screw nut. Thus, the screw nut drives the screwed portion of the steering rack to move, providing driven wheel rotates, producing power steering assist for the user.

In this type of electric power steering system, when choosing belt, the maximum torque limit under different belt tensions can be roughly known through the belt parameters and the installation method. However, the belt tension can be reduced after long-term use or due to mechanism and belt loosening, or deformed or aged belt. When the belt tension is reduced, the torque limit will be relatively reduced, causing occurrence of sliding teeth between the drive wheel/driven wheel and the belt. When sliding teeth occurs, it means the belt transmission mechanism is aged, and the auxiliary power generated by the electric power steering system will become insufficient. If the belt breaks when the user changes the steering direction, the auxiliary power disappears, and a driving danger can occur.

Therefore, how to make the user really understand the health status of the belt transmission mechanism of the electric power steering system by evaluating a sliding teeth condition is necessary and important.

Further, U.S. Pat. No. 8,634,986A1 discloses a method for determining a state of health (SOH) value for an electric power steering (EPS) system in a vehicle having tires and a controller. The method comprises: estimating a first Self-Aligning Torque (SAT) value using a tire dynamics model, wherein the tire dynamics model includes modeled dynamics in the linear region of a lateral force acting on the tires; estimating a second SAT value using an extended state observer and nominal parameters for the EPS system; calculating a variance between the first SAT value and the second SAT value; monitoring a progression of the calculated variance over a calibrated interval using the controller to thereby determine the SOH value, wherein the SOH value is a numeric value in a range of between 0 and 1 that describes the progression of the calculated variance; and automatically executing a control action using the SOH value.

Using this method to obtain the SOH value includes the entire state of the electric power steering system, the SOH of individual components cannot be individually explored, i.e., this method cannot individually detect the health status of the driving belt to avoid sudden belt breakage on the driver's impact Further, WO2017061257 A1 discloses an inexpensive vehicle steering angle detection device that estimates a motor shaft angle and a steering shaft angle with a high degree of accuracy while learning non-linear elements. However, this design can simply detect sudden abnormalities, and the state of health of the electrically assisted steering system cannot be known.

SUMMARY OF THE INVENTION

The present invention has been accomplished under the circumstances in view. It is the main object of the present invention to provide a method of evaluating the health status of belt drive in electric power steering system, which evaluates the health status of the belt drive by means of detecting the occurrence of sliding teeth, reducing the risk of electric power steering system failure.

To achieve this and other objects of the present invention, a method of evaluating the health status of a belt drive in an electric power steering system is disclosed. The electric power steering system comprises a pinion steering mechanism comprising a casing and a steering rack, the casing comprising a first opening and a second opening, the steering rack being mounted in the casing and extended out of the first opening and the second opening, the steering rack comprising a toothed portion and a screwed portion, a pinion fixedly mounted to a steering column and meshed with the toothed portion, a screw nut meshed with the screwed portion in the casing, a motor fixedly mounted to the casing and comprising a rotor and an output shaft rotatable by the rotor, a drive wheel fixedly mounted to the output shaft, a driven wheel mounted to the screw nut and a belt mounted around the drive wheel and the driven wheel. The method comprising the steps of information measurement, information interpretation and sliding teeth state judgment. In the step of information measurement, using a first sensor to measure rotation of the steering column at every operating time point for generation of a first measurement information and a second sensor to measure rotation of the rotor of the motor for generation of a second measurement information. In the step of information interpretation, using an electronic control unit (ECU) to read the first measurement information and the second measurement information and providing the electronic control unit with a data bank that stores a rotation relationship between the steering column and the rotor for judgment. In the step of sliding teeth state judgment, the electronic control unit uses the first measurement information/second measurement information to match with the rotation relationship in the data bank for generating a comparison information, and then the electronic control unit matches second measurement information/first measurement information with the comparison information, and then judges as normal, if the difference between the second measurement information/first measurement information and the comparison information is smaller than a predetermined threshold value, or judges as sliding teeth if such difference exceeding the threshold value.

In this way, when sliding teeth occurs, the health status of the belt transmission mechanism represents the health status of the electric power steering system is lowered and the user can be prompted first to reduce the risk of failure of the electric power steering system.

Preferably, the first measurement information and the second measurement information being selectively a rotation angle, an angular velocity, an angular acceleration, or one of their combinations.

Preferably, the method further comprises a sub step of generating a warning information for generating an alarm after judgement of sliding teeth in step c).

It is worth mentioning that the method further comprises step d) judgment of health status where the electronic control unit records the time point the sliding teeth occurs, and judges the status as alert state if the frequency of sliding teeth within a predetermined period of time is smaller than a threshold frequency that is prestored in said electronic control unit, or danger state if the frequency of sliding teeth within the predetermined time period exceeds the threshold frequency. After judgment of danger state in step d), the electronic control unit generates a warning information for alerting the user.

Further, in step d), a torque sensor is used and mounted on the steering column for measuring the force applied by the driver, or selectively, a current sensor is used for evaluating the output of the motor, and a corresponding output signal is provided to the electronic control unit after measurement of the user's applied force or the output of the motor. Thus, set a high output condition, and define as high output state if the output signal representing the output value is greater than the high output condition, or define as normal state if no sliding teeth occurs, or define as danger state if sliding teeth occurs in a non-high-output state, or define as alert state if sliding teeth occurs in a high output state and the frequency is smaller than the threshold frequency, or define as danger state if sliding teeth occurs in a high output state and the frequency is greater than the threshold frequency.

Other advantages and features of the present invention will be fully understood by reference to the following specification in conjunction with the accompanying drawings, in which like reference signs denote like components of structure.

DETAILED DESCRIPTION OF THE INVENTION

Figure 1:
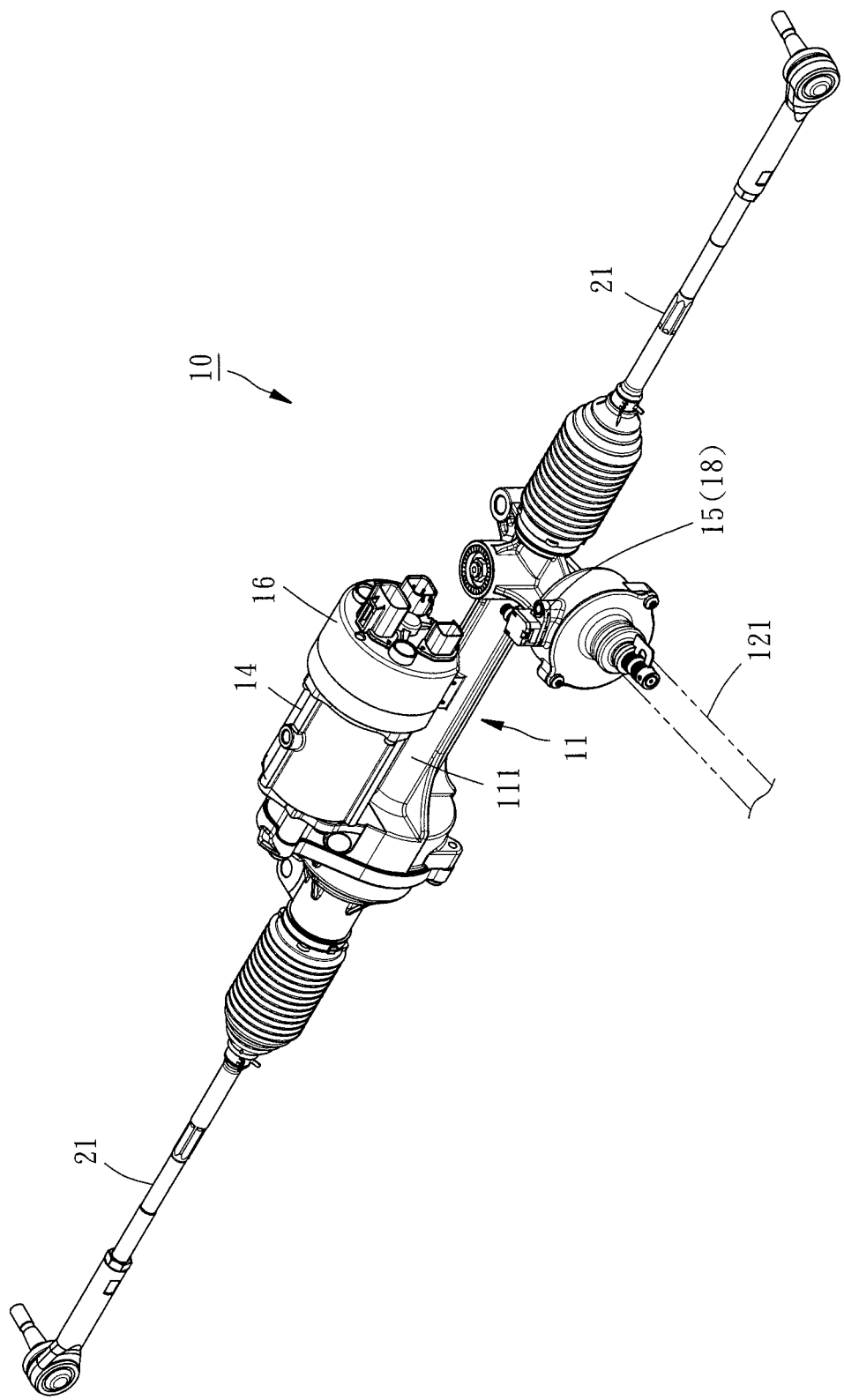
FIG. 1 is an oblique top elevational view of an electric power steering system in accordance with the present invention.
Figure 2:
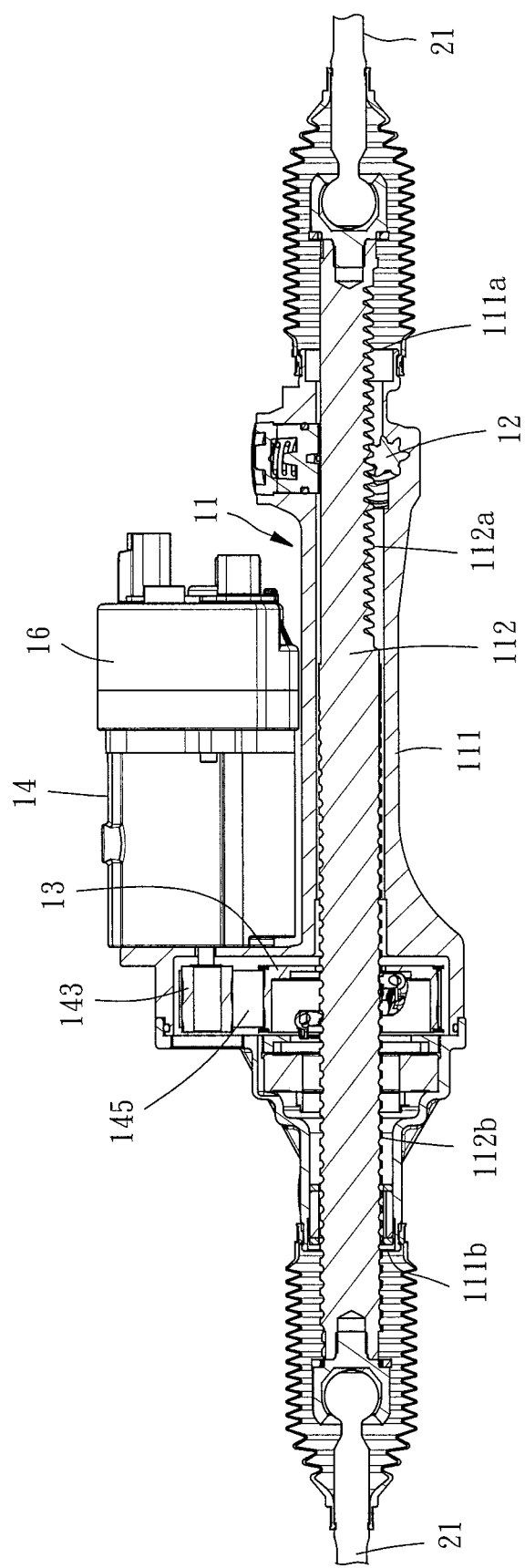
FIG. 2 is a sectional side view of the electric power steering system in accordance with the present invention.
Figure 3:
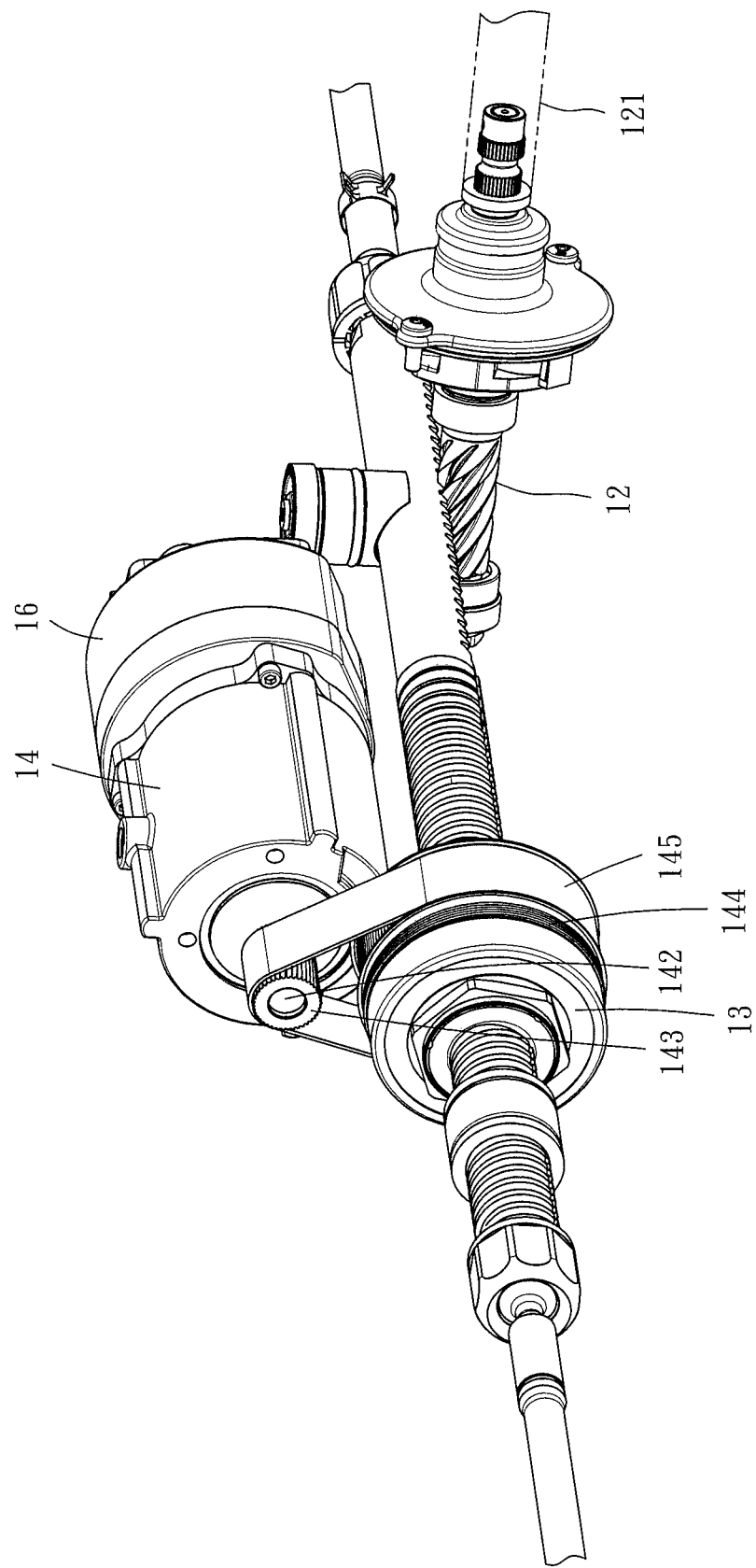
FIG. 3 is an enlarged view of a part of the electric power steering system in accordance with the present invention.

Referring to FIGS. 1-3, a method of evaluating health status of belt drive in electric power steering system in accordance with a first embodiment of the present invention is used in an electric power steering system 10. The electric power steering system 10 comprises a pinion steering mechanism 11, a pinion 12, a screw nut 13 and a motor 14.

The pinion steering mechanism 11 comprises a casing 111 and a steering rack 112. The casing 111 defines a first opening 111a and a second opening 111b. The steering rack 112 is mounted in the casing 111 and extended out of the first opening 111a and the second opening 111b. The steering rack 112 comprises a toothed portion 112a and a screwed portion 112b. The tie rods 21 for connection to vehicle wheels are respectively connected to the steering rack 112 and drivable by the steering rack 112.

The pinion 12 is fixedly connected to a steering column 121 and meshed with the toothed portion 112a. Thus, the pinion 12 can be driven by the steering column 121 to rotate the toothed portion 112a, causing movement of the steering rack 112.

The screw nut 13 is threaded onto the screwed portion 112b in the casing 111. Rotating the screw nut 13 drives the screwed portion 112b to move.

The motor 14 is fixedly mounted to the casing 111. The motor 14 comprises at least one rotor (this part is general technology, not shown in the drawings) and an output shaft 142. A drive wheel 143 is fixedly mounted to the output shaft 142. A driven wheel 144 is mounted to the screw nut 13. A belt 145 is mounted around the drive wheel 143 and the driven wheel 144. When the motor 14 is controlled to rotate the output shaft 142 by means of the rotor thereof, the rotary driving force is transferred through the drive wheel 143 to rotate the belt 145, causing the driven wheel 144 to rotate the screw nut 13 in moving the screwed portion 112b.

Referring to FIGS. 1-5, the method of evaluating the health status of belt drive in electric power steering system in accordance with the first embodiment of the present invention comprises the steps of a) information measurement, b) information interpretation and c) sliding teeth state judgment.

a) Information measurement: Use a first sensor 15 to measure a first measurement information that is generated upon rotation of the steering column 121 at every predetermined time point, and a second sensor 16 to measure a second measurement information upon rotation of the rotor at every predetermined time point.

b) Information interpretation: Use an electronic control unit 17 to read the first measurement information and the second measurement information. The electronic control unit 17 provides a data bank D. The data bank D stores a rotation relationship between the steering column 121 and the rotor for judgment. The rotation relationship is the turn ratio between the rotor and the steering column 121 in the case the electric power steering system is healthy.

Figure 4:
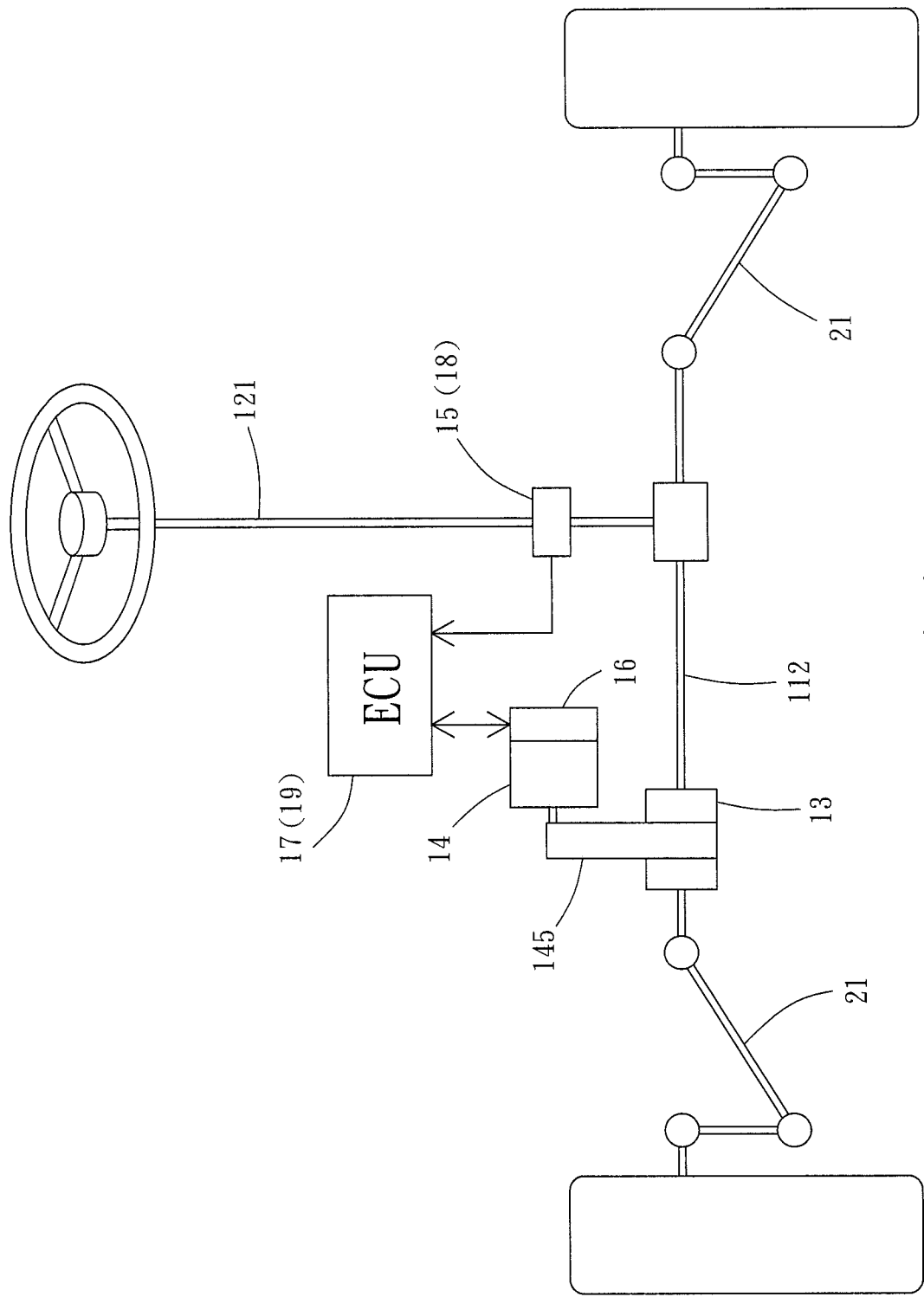
FIG. 4 is a system block diagram of the electric power steering system in accordance with the present invention.
Figure 5:
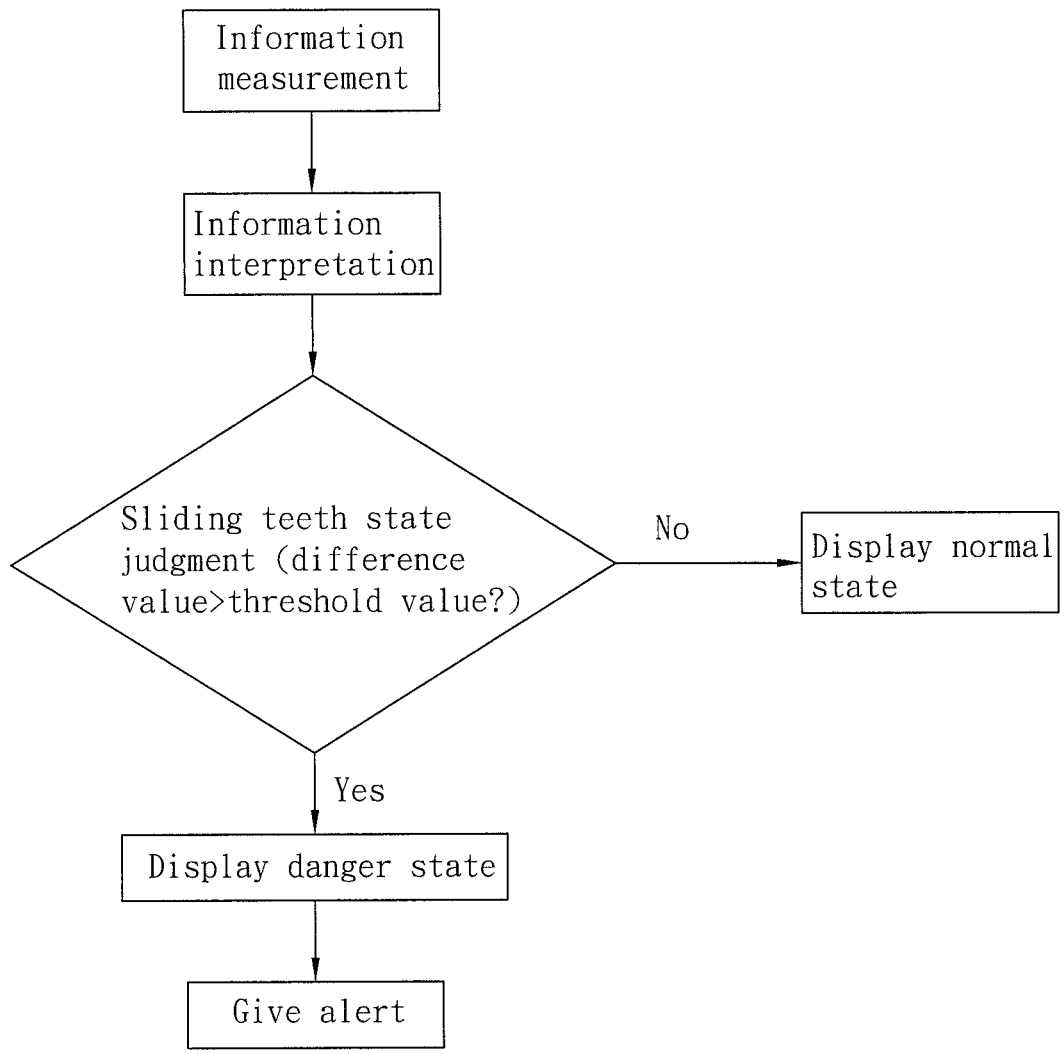
FIG. 5 is a flow chart of method of evaluating health status of belt drive in electric power steering system in accordance with a first embodiment of the present invention is used in an electric power steering system.
Figure 6:
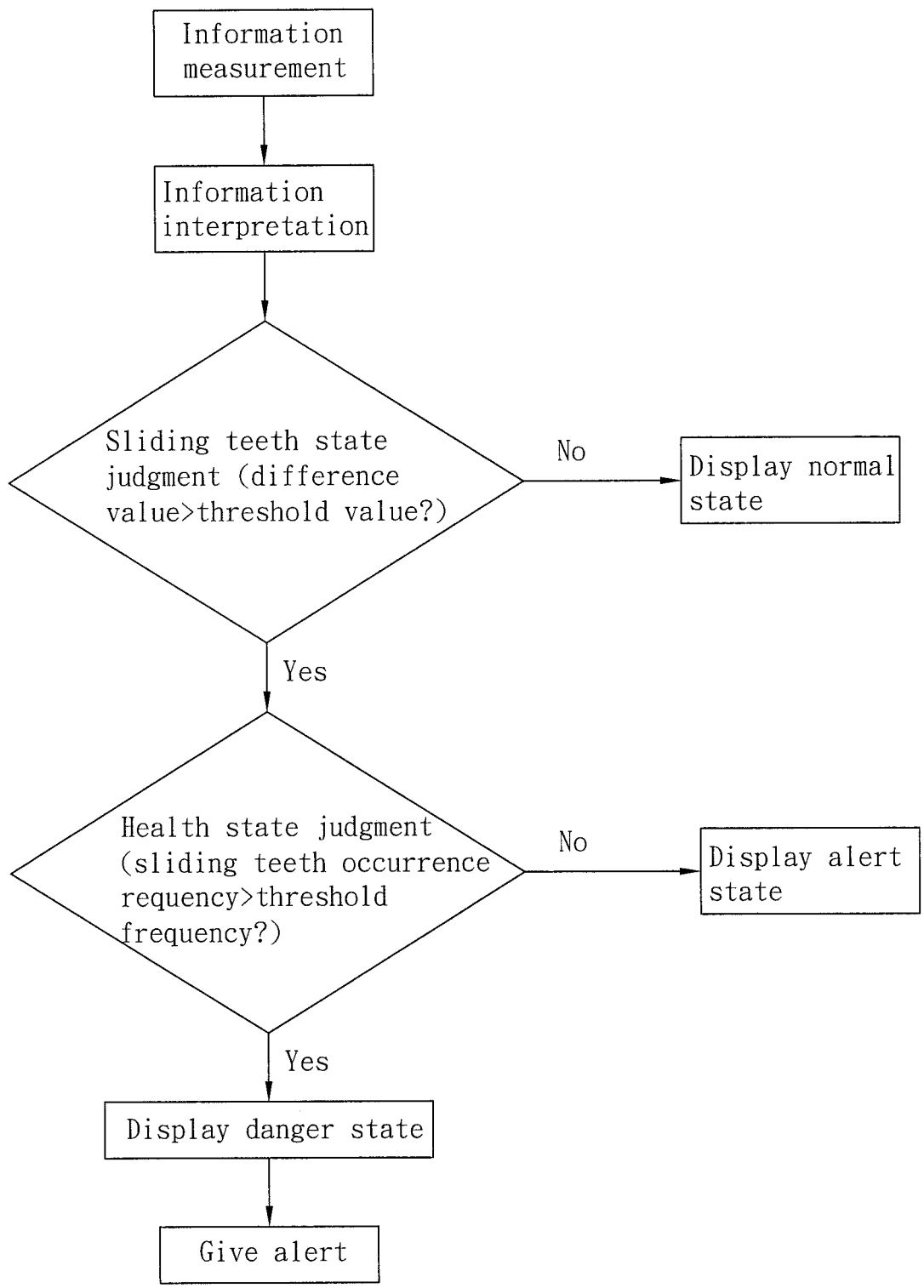
FIG. 6 is a flow chart of method of evaluating health status of belt drive in electric power steering system in accordance with a second embodiment of the present invention is used in an electric power steering system.

For example, as illustrated in FIG. 4, if the number of teeth of the drive wheel 143 is $N_m$, the angle of rotation of the rotor is $\theta_m$ the number of teeth of the driven wheel 144 is $N_{bs}$ and the angle of rotation of the screw nut 13 is $\theta_{bs}$, the following relation is obtained through the transmission of the belt 145:

$$N_m\theta_m = N_{bs}\theta_{bs}$$

Further, when the driven wheel 144 drives the screw nut 13 to rotate, there is a fixed ratio between the number of turns of the screw nut 13 and the moving distance of the steering rack 112; during movement of the steering rack 112, the pinion 12 is driven to rotate by the toothed portion 112a of the steering rack 112, and there is a fixed ratio (linear-angle ratio) between the angle of rotation $\theta_{bs}$ of the pinion 12 and the moving distance of the steering rack where the angle of rotation of the pinion 12 is equal to the angle of rotation $\theta_{bs}$ of the steering column.

Steering rack moving distance (mm)=Linear-angle ratio (mm/deg)*$\theta_{sw}$(deg)

In the case that the number of teeth $N_m$ of the drive wheel 143 is 48 and the number of teeth $N_{bs}$ of the driven wheel 144 is 148, when the screw nut 13 rotates through 360 degrees angle, the steering rack 112 moves 8 mm, thus, when the pinion 12 rotates through 360 degrees angle, the steering rack 112 moves 48.68 mm.

When the driven wheel 143 and the rotor rotate through $\theta_m$, the screw nut rotates through 0.3243 $\theta_m$.

$\theta_{bs}$(deg)=0.3243 $\theta_m$(deg)

When the screw nut rotates through 0.3243$\theta_m$, the steering rack 112 and the toothed portion 112a move 7.207*$10^{-3}\theta_m$(mm)

8/360(mm/deg)*0.3243$\theta_m$(deg)=7.207*$10^{-3}\theta_m$(mm)

When the toothed portion 112a of the steering rack 112 moves 7.207*$10^{-3}\theta_m$(mm), the angle of rotation $\theta_{sw}$ of the pinion 12 and the steering column is 0.0533$\theta_m$(deg).

$\theta_{sw}$(deg)=360/48.68(deg/mm)*7.207*$10^{-3}\theta_m$(mm)

$\theta_{sw}$(deg)=0.0533$\theta_m$(deg) is the turn ratio between the rotor and the steering column 121.

c) Sliding teeth state judgment: The electronic control unit 17 uses the first measurement information/second measurement information to match with the rotation relationship in the data bank D for generating a comparison information. In this embodiment, the second measurement information is used. Alternatively, the first measurement information can be used for matching. The electronic control unit 17 matches the second measurement information/first measurement information with the comparison information. If the difference between the second measurement information/first measurement information and the comparison information is smaller than a predetermined threshold value, for example, 10%, it is judged as normal; if such difference exceeds the threshold value, it is judged as sliding teeth.

Thus, when the phenomenon of sliding teeth occurs, it means the health status of the combination of the belt 145, drive wheel 143 and driven wheel 144 of the electric power steering system drops, and a notice can be given to the user in advance to reduce the risk of failure of the electric power steering system.

It is worth mentioning that the first measurement information and the second measurement information can be rotation angle, angular velocity, angular acceleration or one of their combinations.

Further, in this embodiment, it is selective to generate a warning information by the electronic control unit 117 for alerting the user after judgment of sliding teeth. The warning information can be presented in words, sounds or other methods.

Referring to FIGS. 1-4 and 6, a method of evaluating the health status of belt drive in electric power steering system in accordance with a second embodiment is substantially similar to the first embodiment described above with the exception that this second embodiment further comprises step d) judgment of health status. In judgment of health status, the electronic control unit 17 records the time point the sliding teeth occurs, and judges the status as alert state if the frequency of sliding teeth within a predetermined period of time, for example, 2 seconds is smaller than a threshold frequency (for example, 2 times/2 seconds) pre-stored in the electronic control unit, or judges the status as danger state if the frequency of sliding teeth within the predetermined time period exceeds the threshold frequency. Similarly, after judgment of danger state in step d), the electronic control unit 17 generates a warning information for alerting the user. It is worth mentioning that the result of judgment of health status is used to remind the driver by displaying different signal lights.

Figure 7:
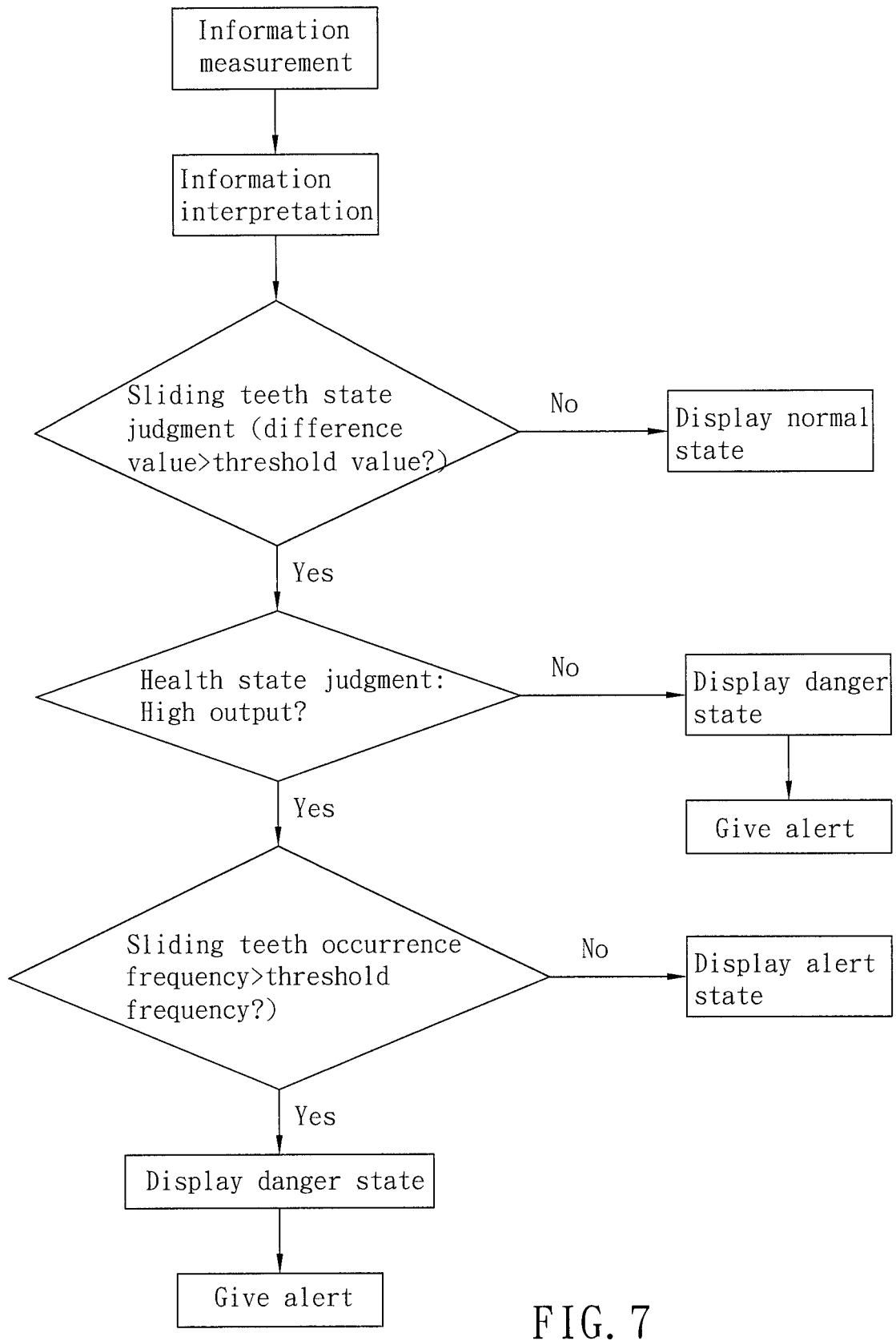
FIG. 7 is a flow chart of the second embodiment of the present invention with high output state judgment condition added thereto.

Further, as illustrated in FIG. 7, in step d), a torque sensor 18 can be used and mounted on the steering column 121 for measuring the force applied by the driver, or selectively, a current sensor 19 can be used for evaluating the output of the motor 14. After measurement of the user's applied force or the output of the motor, a corresponding output signal is provided to the electronic control unit 17; set a high output condition, if the output signal representing the output value is greater than the high output condition, it is defined as high output state; if no sliding teeth occurs, it is defined as normal state; if sliding teeth occurs in a non-high-output state, it is defined as danger state; if sliding teeth occurs in a high output state and the frequency is smaller than the threshold frequency, it is defined as alert state; if sliding teeth occurs in a high output state and the frequency is greater than the threshold frequency, it is defined as danger state. This can be more detailed division of use, closer to the needs of users

What is claimed is:

1. A method of evaluating the health status of a belt drive in an electric power steering system, said electric power steering system comprising a pinion steering mechanism, said pinion steering mechanism comprising a casing and a steering rack, said casing comprising a first opening and a second opening, said steering rack being mounted in said casing and extended out of said first opening and said second opening, said steering rack comprising a toothed portion and a screwed portion, a pinion fixedly mounted to a steering column and meshed with said toothed portion, a screw nut meshed with said screwed portion in said casing, a motor fixedly mounted to said casing and comprising a rotor and an output shaft rotatable by said rotor, a drive wheel fixedly mounted to said output shaft, a driven wheel mounted to said screw nut and a belt mounted around said drive wheel and said driven wheel; the method comprising the steps of:

a) information measurement: using a first sensor to measure rotation of said steering column at every operating time point for generation of a first measurement information and a second sensor to measure rotation of said rotor of said motor for generation of a second measurement information;

b) information interpretation: using an electronic control unit (ECU) to read said first measurement information and said second measurement information; said electronic control unit providing a data bank, said data bank storing a rotation relationship between said steering column and said rotor for judgment; and c) sliding teeth state judgment: said electronic control unit using said first measurement information/said second measurement information to match with the rotation relationship in said data bank for generating a comparison information; said electronic control unit matching said second measurement information/said first measurement information with said comparison information and then judging as normal, if the difference between said second measurement information/said first measurement information and said comparison information is smaller than a predetermined threshold value, or judging as sliding teeth if such difference exceeding said threshold value.

2. The method as claimed in claim 1, wherein said first measurement information and said second measurement information being selectively a rotation angle, an angular velocity, an angular acceleration, or one of their combinations.

3. The method as claimed in claim 1, further comprising a sub step of generating a warning information for generating an alarm after judgement of sliding teeth in step c).

4. The method as claimed in claim 1, further comprising step d) judgment of health status where said electronic control unit records the time point the sliding teeth occurs, and judges the status as alert state if the frequency of sliding teeth within a predetermined period of time is smaller than a threshold frequency that is prestored in said electronic control unit, or danger state if the frequency of sliding teeth within said predetermined time period exceeds said threshold frequency.

5. The method as claimed in claim 4, wherein after judgment of danger state in step d), said electronic control unit generates a warning information for alerting the user. It is worth mentioning that the result of judgment of health status is used to remind the driver by displaying different signal lights.

6. The method as claimed in claim 4, wherein in step d), a torque sensor is used and mounted on said steering column for measuring the force applied by the driver, or selectively, a current sensor is used for evaluating the output of said motor, and a corresponding output signal is provided to said electronic control unit after measurement of the user's applied force or the output of said motor; set a high output condition, and define as high output state if the output signal representing the output value is greater than the high output condition, or define as normal state if no sliding teeth occurs, or define as danger state if sliding teeth occurs in a non-high-output state, or define as alert state if sliding teeth occurs in a high output state and the frequency is smaller than said threshold frequency, or define as danger state if sliding teeth occurs in a high output state and the frequency is greater than said threshold frequency.

* * * * *